D. J. PLEDGER.
AUXILIARY AIR VALVE AND HEATER.
APPLICATION FILED FEB. 5, 1919.
1,384,211.
Patented July 12, 1921.
2 SHEETS—SHEET 2.
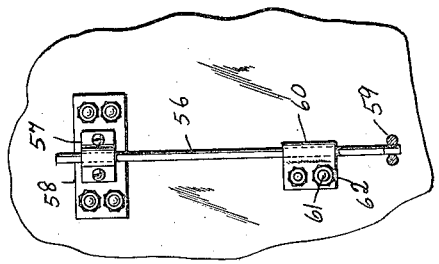
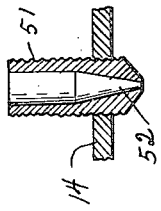
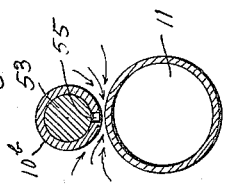
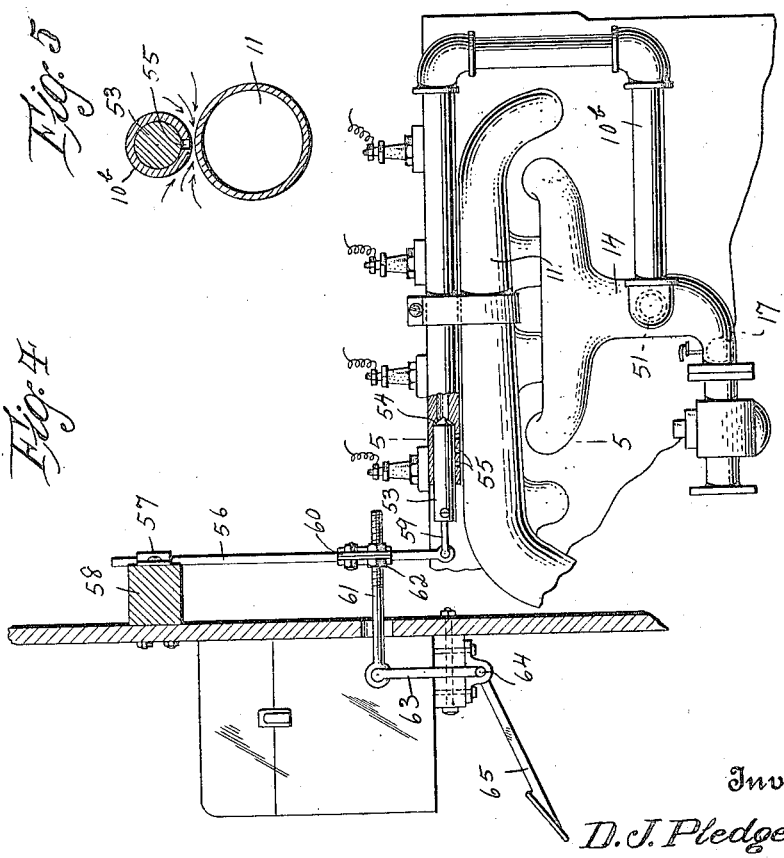
Inventor
D. J. Pledger
By Watson E. Coleman
Attorney

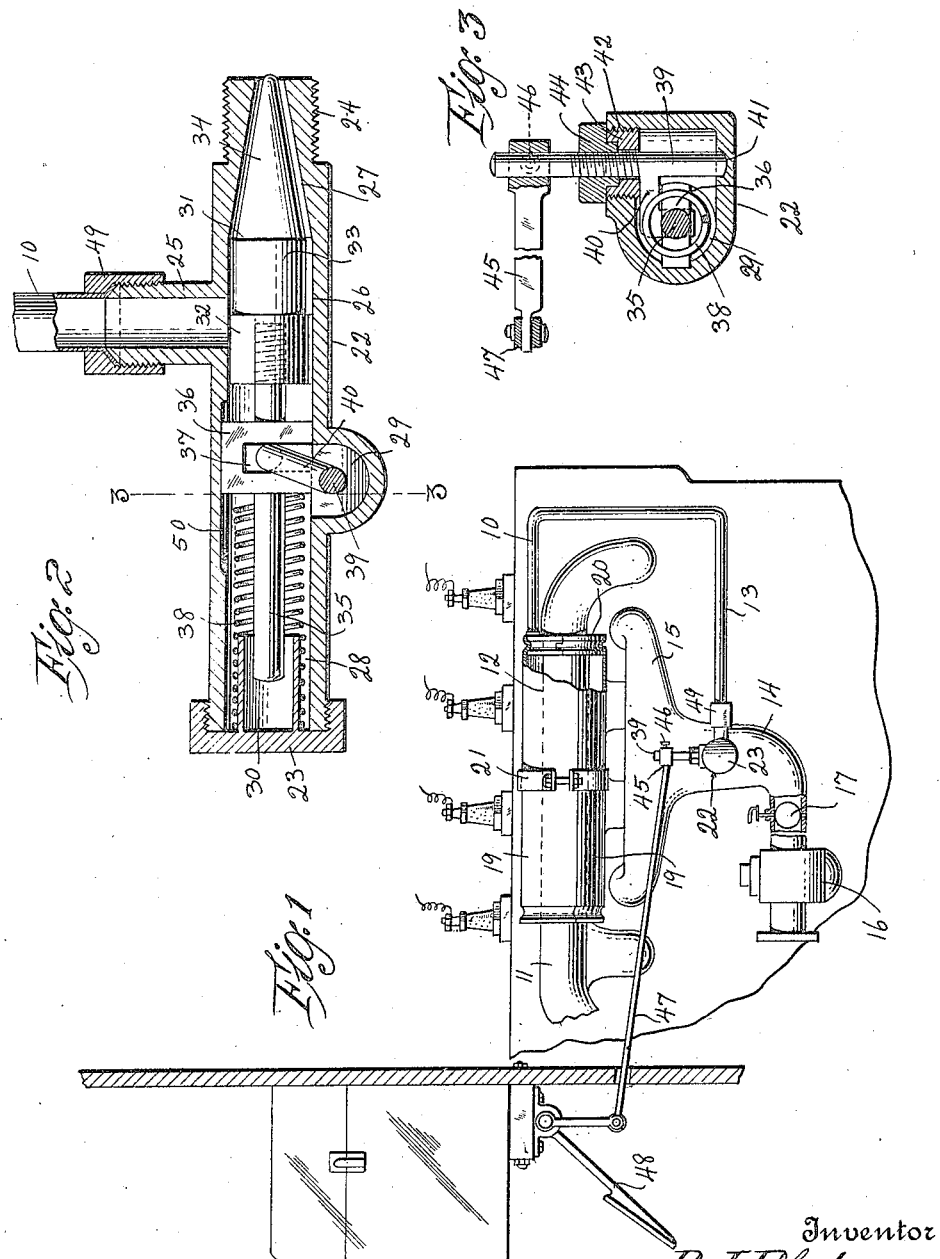

UNITED STATES PATENT OFFICE.

DENNIS J. PLEDGER, OF NEW ORLEANS, LOUISIANA, ASSIGNOR TO PLEDGER APPLIANCE CO., INC., OF NEW ORLEANS, LOUISIANA, A CORPORATION OF LOUISIANA.

AUXILIARY-AIR VALVE AND HEATER.

1,384,211.   Specification of Letters Patent.   Patented July 12, 1921.

Application filed February 5, 1919. Serial No. 275,090.

*To all whom it may concern:*

Be it known that I, DENNIS J. PLEDGER, a citizen of the United States, residing at New Orleans, in the parish of Orleans and State of Louisiana, have invented certain new and useful Improvements in Auxiliary-Air Valves and Heaters, of which the following is a specification, reference being had to the accompanying drawings.

This invention relates to automobile attachments, and particularly to means for admitting auxiliary air to the inlet manifold of an internal combustion engine.

Numerous appliances have been devised for the purpose of permitting the entrance of auxiliary air into the manifold of an internal combustion engine and of controlling the admission of such air, but these appliances either do not properly control the entrance of air or admit only cold air to the manifold between the carbureter and the intake port of the engine, or else these appliances admit air between the carbureter and the throttle valve so that the position of the throttle valve controls the action of these auxiliary air appliances. In this last case, the air is sucked through the carbureter on the intake stroke of the piston and the air is drawn through the carbureter in such a manner as to cause it to pick up particles of the fluid gases. The throttle valve is opened only when the engine is running at full speed and as a motor car is rarely, if ever, run at its maximum speed, the throttle valve is partially closed almost all the time and as the speed of the engine is reduced, so must the opening of this valve be reduced and thus when the speed of the engine is reduced to a minimum, the throttle valve is so nearly closed that the amount of air admitted is far short of enough to secure a proper vaporization of the gasolene and the consequence is the engine pumps a very poorly vaporized mixture in the combustion chamber, which mixture, while combustible, is not highly or perfectly explosive.

Furthermore, the throttle valve is so nearly closed that there is a partial vacuum in the cylinder on the intake stroke which in itself uses up power, because of the relatively small amount of mixture which enters the cylinder of the engine, there is a decided lack of compression in the cylinder which, of course, affects perfect combustion of the mixture. Now the carbureter under these circumstances must be so adjusted that the engine will get sufficient fuel to cause motion, while the throttle valve is nearly closed. This means a very thick or rich mixture due to the small air intake and as it is not practical to adjust the carbureter for several or different speeds while driving, the carbureter adjustments so set give a rich and wasteful mixture to the engine while running at its minimum speed which becomes more wasteful as the speed of the engine is increased. This is evidenced by the deposition of carbon in the cylinder, for if there was perfect vaporization and perfect combustion, there would be no carbon in the cylinder.

The general object of my invention is to overcome these objectionable features by providing means whereby air which has been previously heated may be sucked into the manifold at a point between the carbureter and the cylinders whereby this air may be discharged in the form of a jet at right angles to the direction of flow of the current in the intake manifold.

And a further object is to provide improved means for heating this auxiliary air prior to its admission to the intake manifold and to provide an improved valve so formed that the amount of this auxiliary air injected into the intake manifold may be accurately regulated, and further so formed that the jet will be projected with a maximum of force without regard to the amount of air which may be allowed to enter the intake manifold.

A further object is to provide a device of this character wherein the admission of auxiliary air may be very easily controlled and wherein this regulated control of the auxiliary air may be secured without the necessity of in any way altering the carbureter adjustments, thus permitting the operator to control the richness or leanness of the fuel mixture at all times and very expeditiously.

Still another object is to provide an auxiliary air mechanism which may be applied to practically all types of automobile explosive engines without in any way changing the mechanism of the engine or rearranging any parts, and further in this connection to provide a mechanism which may be disposed in many different positions and connected up to operating means mounted on the dash board of the car or on the floor of the car, and in the most convenient location for the driver.

My invention is illustrated in the accompanying drawings, wherein:—

Figure 1 is a side elevation of a portion of an internal combustion engine and showing in section the dash board of a motor driven vehicle with my invention applied;

Fig. 2 is a vertical sectional view of the auxiliary air controlling valve used with the construction illustrated in Fig. 1;

Fig. 3 is a section on the line 3—3 of Fig. 2;

Fig. 4 is a like view to Fig. 1, but showing another form of my invention;

Fig. 5 is a section on the line 5—5 of Fig. 4;

Fig. 6 is a fragmentary elevation of the dash board and showing the valve carrying rod and the clips supporting the rod whereby it may be connected to the pedal; and Fig. 7 is a longitudinal sectional view of the nozzle 51.

In the drawings I have illustrated two forms of my invention, in one of which the passage of air to the inlet manifold of the engine is controlled at the air entrance of a heating pipe, while in the other form of my invention, the entrance of air to the manifold is controlled at the junction of the air pipe with the manifold and by a specially constructed needle valve. This latter construction I regard as preferable and I will describe it first. In Fig. 1 I have illustrated an air inlet pipe designated 10 which, as illustrated, may rest upon the exhaust manifold 11, which is the ordinary exhaust manifold of the engine. This hot air pipe 10 opens into a heating drum or exhaust pipe heater 12 which, to all intents and purposes, forms a continuation of the pipe 10. The pipe 10 extends outward and then downward and then inward toward the intake manifold as at 13. At the inner end of this portion 13 of the air pipe 10, I provide a controlling valve illustrated in Fig. 2 which causes the discharge of air into the upwardly extending portion 14 of the intake manifold 15 of the engine. The portion 14 of the manifold 15 at its lower end is connected to a carbureter 16, and between this carbureter and the point at which the hot air pipe 10 enters the manifold, there is disposed the usual throttle valve 17. Before describing the special valve which controls the entrance of hot air into the manifold leg 14, I may say that I do not wish to be limited to the use of a hot air pipe which is open at one end and simply lies upon the top of the exhaust manifold 11, but that I may provide other means for heating the air. Thus, for instance, in Fig. 1, I show an exhaust pipe heater 12 composed of two cylindrical sections 19 embracing the exhaust pipe 11. These semi-cylindrical sections have heads 20 at their outer ends and are formed with suitable inlet openings and held upon the exhaust pipe by means of clamps 21. In this case, the pipe 10 which is the hot air pipe, extends from an opening in this exhaust heater 12, or I may use an exhaust heater comprising merely one of the sections of the heater 19 which shall partially surround the exhaust pipe and from which the air pipe 10 shall extend. Any of these constructions may be used for primarily heating the air prior to its entrance into the intake manifold leg 14.

As before stated, it is necessary, in order to secure perfect vaporization, that the air shall not only be heated, but that it shall be directed into the fuel stream at right angles to the direction of movement of the stream, so as to break this stream up and cause the intimate mixture of the hot fresh air and the fuel.

For the purpose of causing the entrance of a jet of heated fresh air into the depending leg of the inlet manifold at right angles to the direction of movement of the fuel stream therein, I provide a valve casing 22 which is tubular in form and which, at one end, is closed by a cap 23 and at the other end is exteriorly reduced and screw-threaded, as at 24, to engage with screw-threads formed in the wall of an aperture entering the leg 14. The casing 22 is formed with a branch 25 extending at right angles thereto and between this branch 25 and the inner extremity of the casing, the bore of the casing is formed to provide a portion 26 having a uniform diameter, and then the bore tapers uniformly to the outlet end of the casing, as at 27. The portion 26 of the casing having a uniform diameter, extends rearward or outward of the branch 25 for a predetermined distance and from thence outward the bore has a uniform internal diameter as at 28. The middle of the casing is enlarged, as at 29. The cap 23 which closed the outer end of the casing is formed at its center with a tubular head 30.

Disposed within the valve casing is the valve 31. The rear portion 32 of this valve has a diameter approximately the same as the diameter of the portion 26 of the casing, and forward of this part, the diameter is reduced, as at 33, and then the valve tapers forwardly so as to form a conical portion 34 which operates within the tapered portion 27 of the valve casing. It will be obvious that when the valve is moved forward, it can entirely close passage through the branch 25 and entirely close the outlet end of the casing, and as it is moved rearward it will increase the inlet of air from the branch 25 and increase the effective discharge opening. Rearward of the portion 32, the valve is provided with a stem 35, which enters the tubular head 30. At its middle, the valve stem is formed to provide a yoke 36 slotted, as at 37, at right angles to the axis of the valve, and a spring 38 bears against this yoke at its forward end and at its rear end, and bears against the cap 23. This spring acts to urge the valve 31 in a direction to close the outlet from the casing.

For the purpose of shifting the valve longitudinally within the casing to control the effective area of the inlet opening and the outlet opening, I provide a stem or key 39 which is formed adjacent its lower end with an outwardly extending bit or lug 40 and having a downwardly extending portion which projects into the slot 37 of the yoke 36. At its lower extremity, this stem or key 39 is rounded to fit within a seating recess or step bearing 41 formed in the valve casing opposite the step bearing 41 and through this, the stem 39 passes. A nut 43 is exteriorly screw-threaded for engagement with the wall of the opening 42 and forms a packing gland through which the stem passes. A nut 44 is also mounted upon the stem and preferably is adapted to engage in a recess in the nut 43 so as to prevent the escape of gas around the stem, while permitting free rotation of the stem or key 39. Rotatably adjustable upon the upper end of the stem or key 39, is an arm 45 which is held in adjusted position on the stem 39 by means of a set screw 46, and this arm is pivotally connected at its extremity to a link 47 which, in turn, is connected to operating means.

I do not wish to be limited to any particular operating means for this valve, but I have illustrated in Fig. 1, a pedal or foot lever 48 which is pivotally mounted upon the dash board of the machine and has a depending arm which is pivotally connected to the link 47. When the foot lever 48 is depressed, it will act to shift the valve 31 toward its open position, and when the foot lever is released, the spring 38 will act to shift the valve 31 to its closed position. Therefore, the valve is entirely controlled by the foot lever.

Connected by a coupling 49 of any suitable character to the branch 25 is the hot air inlet pipe 10 which was previously described. Preferably, and in order to prevent any rotation of the valve 31, I provide a guide slot 50 in the wall of the casing, in which the butt end of the yoke 36 slides.

It will be seen that a valve constructed in accordance with Fig. 2 will admit heated air to the intake manifold of an engine and admit it at a rapid rate and with a force which does not vary in proportion to the quantity which may be admitted, but that the air will be ejected with strength and with speed into the leg 14 of the intake manifold and at a direction at right angles to the direction of the current in said manifold passing from the carbureter to the engine. This air will be in the form of a hollow cone which will impinge upon the particles of the mixture passing from the carbureter with great force, and inasmuch as this air is heated and inasmuch as it enters at right angles to the stream passing through the carbureter, it will atomize and break up the liquid particles and act to thoroughly vaporize these liquid particles, putting them in the best possible condition for combustion. No matter to what degree the valve may be opened, the action of the valve will be the same to eject a jet of heated, fresh air into the center of the manifold at right angles to the course of current therein, and it is obvious that the amount of air being ejected from the heater may be very delicately controlled to suit any particular circumstance of operation.

Furthermore, it will be seen that the valve casing 22 with its valve 31 therein, may be readily attached to any and all makes of motor car engine where two or more inches of the intake manifold is exposed and the valve may be operated either by a direct push or a direct pull from any convenient place and that it is not necessary to provide a foot pedal for this purpose if a foot pedal is not desirable, but that other means may be used for this purpose. It is pointed out that this facility in placing the foot lever or other operating device and operating the valve either by a push or a pull is largely due to the fact that the arm 45 is adjustable around the stem 39. I do not wish to be limited to any exact location for the valve, as it may be disposed at any place on the intake manifold, provided it causes a cross current to that already in the manifold. On certain makes of cars, however, the best possible place and the one which is most accessible, is at the lower end of the depending leg 14 of the inlet manifold.

In Figs. 4 and 6 I show another means for controlling the inlet of air to the intake manifold, in which a nozzle 51 is disposed through the wall of the leg 14 of the intake manifold, this nozzle having a contracted outlet port 52, and the nozzle being exteriorly screw-threaded for engagement with the wall of the manifold. To this nozzle is connected the air pipe $10^b$, which air pipe is shown as extending along the exhaust manifold 11 and resting thereon, and being held thereto by suitable clamps. The inlet end of this pipe $10^b$ is open, and operating within this inlet end is a longitudinally shiftable valve 53. The air inlet pipe inward of its open end, is formed with a seat 54, and the valve 53 has a diameter greater than the diameter of this seat and is conical at its end so as to close tightly against this seat when the valve is closed. Outward of this seat 54, the valve casing or inlet end of the pipe 10 is formed with a plurality of air inlet ports 55 arranged in longitudinal series so that as the valve 53 is retracted, these ports will become one by one uncovered. Preferably, these ports are disposed on the under side of the pipe 10<sup>b</sup> adjacent the surface of the exhaust manifold so that the air passing into these ports will be heated even before it enters the pipe 10<sup>b</sup>.

For the purpose of shifting this valve 53 to open one or more of these air inlet ports 55, I provide a resilient member 56 which is attached by a clamp 57 to a bracket 58 projecting outwardly from the dash board of the vehicle, and the lower extremity of this resilient member 55 is connected by a link 59 to the valve 53. It will be noted that the resilient rod 56 can be vertically adjusted in the clamp 57 to suit any circumstance of necessary adjustment. Mounted upon the rod 56, is a clip 60 which embraces this rod and is adjustable therealong, and which is provided with a perforation through which a screw-threaded arm or rod 61 passes. Nuts 62 engage this screw-threaded rod on opposite sides of the clip 60 and hold the screw-threaded rod in adjusted relation to the cleat. The inner end of this arm 61 is formed with an eye, to which the arm 63 is connected, this arm extending from a shaft 64, from which shaft extends the foot lever 65.

With this construction also, the amount of air entering the manifold may be controlled to any degree required and this hot air is projected into the manifold at right angles to the current therein in the form of a conical jet and which impinges against the liquid particles of the fuel with great force, breaks up these particles and vaporizes them so as to put the fuel in the best possible condition for combustion. Inasmuch as the valve 53 is rotatable within the valve casing formed by the rear end of the pipe 10<sup>b</sup>, and inasmuch as it is obvious that this rotation will not affect the action of the valve as regards the ports 55, it is obvious that the member 56 and its supporting bracket may be mounted in any desired location where it will be convenient to connect up with the foot lever or other operating means.

It will be seen that both forms of my invention, and particularly the first form described, applies most effectively the action of hot air to the partial vaporized mixture delivered from the carbureter. This mixture is in a very low state of vaporization when delivered from the carbureter and when taken into the combustion chamber of the engine will be only partially burned, the greater part being exhausted through the exhaust pipe in the form of smoke and soot and an appreciable part remaining behind in the cylinder as carbon, but with my appliance, when the throttle valve is partly closed, there is a strong suction against the valve plunger, that is the part 53 in Fig. 4, or the part 31 in Fig. 2, and assuming that this valve is open, this suction draws through the heating pipe and into the intake manifold the desired amount of heated air which is delivered in the form of a jet or rapidly moving hot blast through the contracted opening on the inside of the manifold and at right angles to the current in the manifold. Because of this rapidly moving cross current of fresh heated air, there is set up a great agitation within the manifold itself, thus the incompletely vaporized mixture passing through the carbureter is affected by heat and air friction and perfect vaporization results. Indeed, I have found in practice that the use of my valve effects a saving of from 30% to 60% in the operation of the car. All my devices act to render the fuel more combustible without rendering the mixture too thin. Furthermore, this inlet of fresh, warm air is entirely controlled by the operator so that he may change the amount of auxiliary air entering the intake pipe entirely in accordance with the temperature, humidity, and other factors which have to be considered in the operation of a motor car.

I claim:—

1. The combination with the intake manifold of an internal combustion engine having cylinders and a carbureter connected thereto, of a valve casing discharging into the manifold between the carbureter and the cylinders and having a longitudinally extending bore, the bore having a uniform diameter for a certain distance and then gradually tapering to the discharge end of the bore, the valve casing having an air inlet port inward of the tapered portion of the bore, a valve operating longitudinally of the casing, the valve having a portion of uniform diameter fitting that portion of the casing having a uniform diameter and closing the inlet opening, and the valve having a tapered portion adapted to fit the tapered portion of the bore and to project through the opening at the discharge end of the bore and into the manifold when the valve is closed, the portion of the valve having a uniform diameter normally closing the inlet opening but moving beyond the inlet opening when the valve is fully retracted, and manually operable means for longitudinally shifting the valve to control the amount of air discharged through the bore, the axis of the valve being disposed at right angles to the direction of current in the manifold.

2. The combination with the intake manifold of an internal combustion engine having cylinders and a carbureter connected thereto, of a valve casing discharging into the manifold between the carbureter and the cylinders of the engine and having a longitudinally extending bore, the bore at its discharge end tapering to the outlet of the valve casing, the valve casing having an air inlet port inward of its discharge end, and a valve operating longitudinally of the casing, the valve being tapered adjacent one end to fit and close against the tapered portion of the bore, the base of the tapered portion of the valve when the valve is retracted passing beyond the inlet port, and manually operable means for longitudinally shifting the valve to control the amount of air discharged through the bore, the common axis of the valve and valve casing being disposed at right angles to the direction of current in the manifold.

3. A valve casing having a discharge outlet at one end and having an inlet port in its side wall, a longitudinally movable valve controlling passage through the inlet port and through the discharge opening and having a stem formed with a U-shaped yoke, the valve casing being formed to provide a chamber extending laterally from the wall of the valve casing opposite said yoke, a spindle passing through said chamber and having a radially projecting bit engaging in the slot defined by the yoke to thereby shift the valve longitudinally upon a rotation of the spindle, and means for closing said chamber.

4. The combination with the intake manifold of an internal combustion engine and a carbureter connected thereto, of a valve casing having a tapering discharge outlet at one end and having an air inlet port in its side wall, and a longitudinally movable valve controlling passage through the air inlet port and through the discharge opening and having a stem formed with a slotted yoke, a spindle passing through the valve casing and having a bit engaging the yoke to thereby shift the valve longitudinally upon the rotation of the spindle, and manually operable means for rotating the spindle, said means including an arm adjustable around the spindle.

5. The combination with the intake manifold of an internal combustion engine having cylinders and a carbureter connected thereto, of a valve casing discharging into the manifold between the carbureter and the cylinders and having a longitudinally extending bore having a uniform diameter for a certain distance and then gradually tapering to the discharge end of the bore, the valve casing having an air inlet port slightly inward of the tapered portion of the bore, and a valve operating longitudinally of the casing, the valve having a portion of uniform diameter fitting that portion of the casing having a uniform diameter and closing the inlet port when the valve is closed, and said valve having a tapered portion adapted to fit the tapered portion of the bore, means urging the valve to its seat to thereby cut off the admission of air to the intake manifold, and manually operable means for longitudinally shifting said valve to retract it from the discharge end of the bore and to thereby open communication between the air inlet port and the interior of the manifold and to control the amount of air discharged through the bore, the axis of the valve being disposed at right angles to the direction of current in the manifold.

In testimony whereof I hereunto affix my signature in the presence of two witnesses.

DENNIS J. PLEDGER.

Witnesses:
 S. H. HAMBURGER,
 LEON C. WEISS.